UNITED STATES PATENT OFFICE.

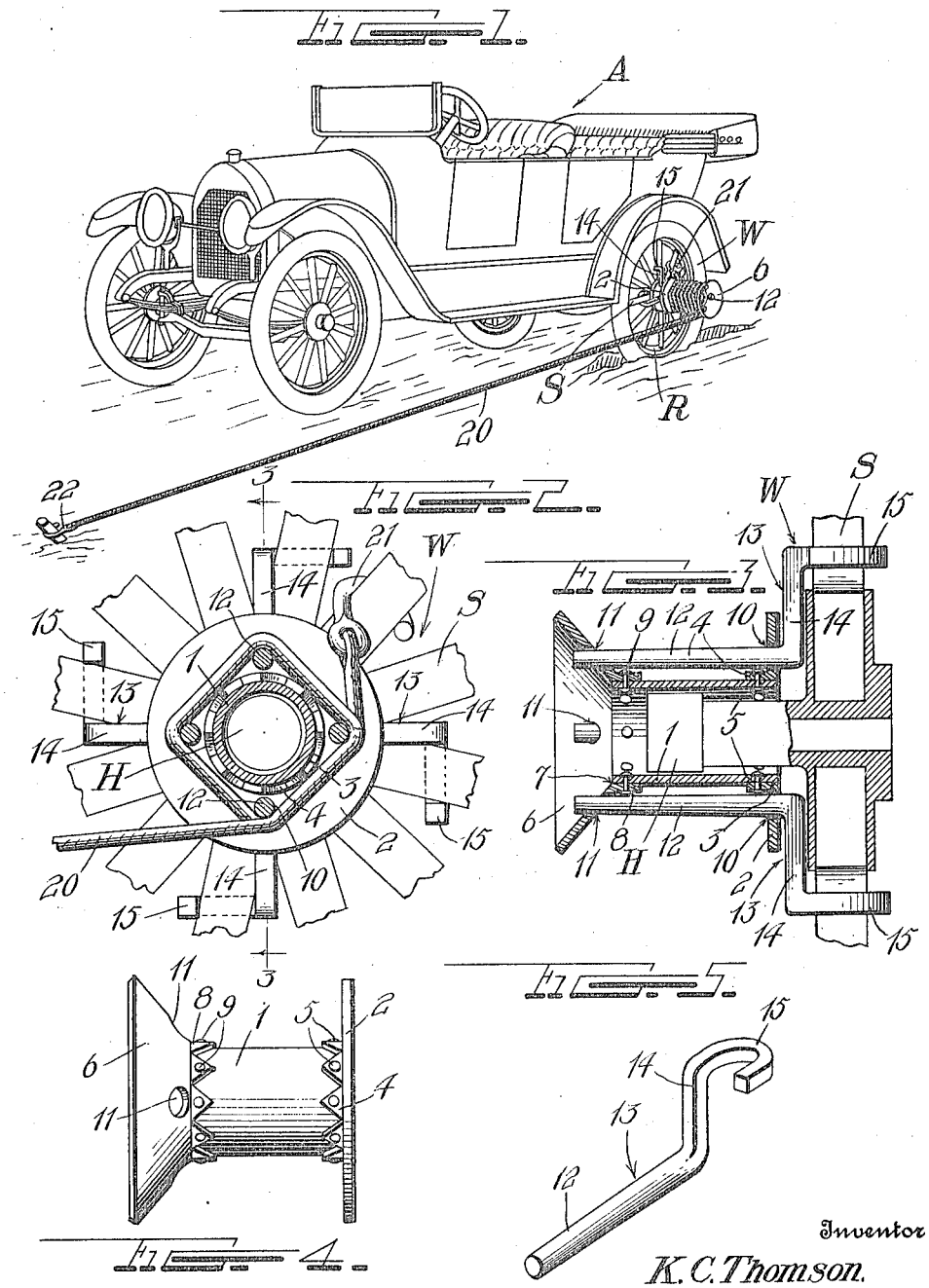

KELLER C. THOMSON, OF YAZOO CITY, MISSISSIPPI.

DRAFT ATTACHMENT FOR AUTOMOBILES.

1,162,822.  Specification of Letters Patent. Patented Dec. 7, 1915.

Application filed November 5, 1914. Serial No. 870,486.

*To all whom it may concern:*

Be it known that I, KELLER C. THOMSON, citizen of the United States, residing at Yazoo City, in the county of Yazoo and State of Mississippi, have invented certain new and useful Improvements in Draft Attachments for Automobiles; and I do declare the following to be a full, clear, and exact description of the invention such as will enable others skilled in the art to which it appertains to make and use the same.

My invention relates to improvements in draft attachments to be applied to automobile wheels for pulling the machine out of chuck holes and the like, or for climbing steep and slippery grades.

The object of the invention is to provide a simple device which may be easily and inexpensively manufactured, and which will well perform the functions for which it is designed.

With the above and minor objects in view, my invention resides in certain novel features of construction and combination hereinafter described and claimed and shown in the drawings wherein:

Figure 1 is a perspective view of a portion of an automobile showing the application of the invention thereto; Fig. 2 is a vertical transverse section showing the device attached to one of the wheels of the machine; Fig. 3 is a detail vertical section taken on the line 3—3 of Fig. 2; Fig. 4 is a side elevation of the drum to be described, and Fig. 5 is a perspective view of one of the attaching hooks.

In the embodiment illustrated in the accompanying drawings, an automobile A is shown, said automobile being provided with the usual drive wheels W which include rims R, spokes S, and an outwardly projecting hub H. Movably positioned upon the hub H, is a cylindrical sleeve 1 whose inner end is surrounded by a substantially flat annular plate 2, the latter having a central opening 3 through which the inner end of the sleeve 1 projects. In forming this opening 3, a plurality of attaching ears 4 are struck outwardly as clearly seen in Figs. 2 and 4, said ears being secured by rivets 5 to the sleeve 1. Surrounding the outer end of the sleeve 1 is a substantially cone-shaped plate 6 which is provided with a central opening 7 from which a plurality of ears 8 are struck inwardly, said ears being secured by rivets 9 to the outer end of the sleeve 1.

Formed through the inner and outer plates 2 and 6, and spaced suitable distances around the sleeve 1, are inner and outer series of alined openings 10 and 11, four openings being here shown in each series. The openings 10 and 11 receive one arm 12 of L-shaped attaching members 13, the other arms 14 of said members radiating from the opening 10 and being bent laterally to provide hooks 15 which lie in planes parallel to the arms 12. These hooks 15 embrace certain of the spokes S, and thereby prevent the drum (consisting of the sleeve 1, and the end plates 2 and 6) from turning irrespectively of the wheel.

From the construction, so far described, it will be seen that the members 13 may be moved inwardly with respect to the drum, thereby allowing the hooks, whose bills face outwardly, to be readily engaged with the spokes S, whereupon the arms 12 of said members may be again forced to their limits within the openings 10 and 11.

It now becomes expedient to provide simple and efficient means for preventing the drum from moving outwardly when the device is in operation. For this purpose, a cable 20, to be wound around the spool or drum, is provided with a hook 21 at one end, and with a similar hook 22 at its other end. Either end of the cable may be now wound one or more times around the sleeve 1, after which its hook may be engaged with one of the spokes S, as clearly shown in Fig. 1. The other end of the cable is now secured, by means of its hook, to a stationary object in advance of the machine, which object may well be a stake or spike driven into the road bed, as shown. With the parts in this position, rotary motion is imparted to the wheels W by starting the motor of the machine, this rotary motion now winding the cable 20 upon the drum, and drawing the latter into tight engagement with the flange of hub H, it being understood that this operation is caused by the connection of the cable with the wheel. As the cable is now wound upon the drum, the machine is gradually drawn forward to the necessary extent. The entire draft device may then be detached and stored beneath the seat of the car, or in any other appropriate place.

It may here be explained that as the cable is wound upon the drum, said cable contacts with the arms 12 of the attaching members 13, thereby preventing the drum from being easily removed, when the device is in operation, even though one of the hooks on the cable be attached to some device other than one of the spokes. This forcible frictional contact is relieved, however, the moment the cable becomes inactive, thereby allowing the device to be readily removed from the wheel.

From the foregoing description, taken in connection with the accompanying drawings, it will be seen that a comparatively simple device has been provided for carrying out the object of the invention, yet that the efficiency of the article will not be impaired by such simplicity.

I claim:

1. The combination with a driven wheel having a hub, of a plurality of parallel arms projecting laterally from the wheel and spaced from the hub, a sleeve surrounding the hub and interposed between the same and the arms, annular end plates carried by the sleeve whereby to form a drum, said plates having alined openings receiving said arms, and a cable wound upon said drum and contacting with said arms.

2. The combination with a driven wheel having a hub, of a drum having a central opening receiving said hub and a number of eccentric openings, parallel arms extending through said eccentric openings and having their inner ends bent radially outward and then extended laterally and formed into hooks embracing the spokes of the wheel, and a cable wound around the drum.

3. The combination with a driven wheel and a drum removably connected thereto and free to move outwardly therefrom, of a cable wound around said drum and having a hook on one of its ends embracing one of the spokes of the wheel, whereby said hook simultaneously prevents removal of the drum and slipping of the cable.

4. The combination with a driven wheel, and a plurality of parallel arms projecting laterally therefrom and spaced around the axis thereof, of a drum having a pair of outwardly projecting annular end flanges provided with openings spaced outwardly from the drum proper and receiving the aforesaid arms, whereby to dispose the latter contiguous to the outer side of said drum proper, and a cable wound around the drum and the arms contiguous thereto.

5. A device of the class described comprising a drum having a central opening for the reception of the hub of a vehicle wheel, and a number of eccentric openings, and parallel arms extending through said eccentric openings and having one end bent radially outward and then extended laterally and formed into hooks for embracing the spokes of the wheel, substantially as and for the purpose set forth.

6. A device of the class described comprising a sleeve adapted to receive therein a hub, annular end plates carried by the sleeve whereby to form a drum, said plates having alined openings spaced around the exterior of the sleeve, and a plurality of parallel arms passed through the alined openings and disposed contiguous to the outer side of said sleeve, one end of said arms having means for attachment to a vehicle wheel, substantially as and for the purpose set forth.

In testimony whereof I have hereunto set my hand in presence of two subscribing witnesses.

KELLER C. THOMSON

Witnesses:
N. L. SWAYZE,
A. DAVIT.